United States Patent
Fenicle et al.

(10) Patent No.: US 9,990,213 B2
(45) Date of Patent: *Jun. 5, 2018

(54) SYSTEMS AND METHODS FOR DATA BRICK CREATION AND USE

(71) Applicant: Liberty Peak Ventures, LLC, Plano, TX (US)

(72) Inventors: Joe M. Fenicle, Phoenix, AZ (US); Krishna K. Lingamneni, Phoenix, AZ (US); Ron Sexton, Green Valley, AZ (US); Martin D. Lantry, New River, AZ (US); Arnold S. Santos, Quezon (PH)

(73) Assignee: Liberty Peak Ventures, LLC, Plano, TX (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/131,369

(22) Filed: Apr. 18, 2016

(65) Prior Publication Data

US 2016/0306640 A1 Oct. 20, 2016

Related U.S. Application Data

(63) Continuation of application No. 13/340,004, filed on Dec. 29, 2011, now Pat. No. 9,317,305.

(51) Int. Cl.
*G06F 9/45* (2006.01)
*G06F 9/445* (2018.01)
*G06F 17/30* (2006.01)

(52) U.S. Cl.
CPC .......... *G06F 9/44505* (2013.01); *G06F 8/443* (2013.01); *G06F 9/445* (2013.01);
(Continued)

(58) Field of Classification Search
CPC .. G06F 11/3684; G06F 9/44521; G06F 3/061; G06F 17/30339; G06F 8/20;
(Continued)

(56) References Cited

U.S. PATENT DOCUMENTS 4,742,467 A * 5/1988 Messerich ................. G06F 8/20
717/111
5,412,801 A * 5/1995 de Remer ............... G06F 12/16
707/999.01

(Continued)

OTHER PUBLICATIONS

IBM_z/OS, Application Programming on z/OS , IBM, copyright 2006,2010, pp. 1-80 <zOS_IBM06.pdf>.*

(Continued)

*Primary Examiner* — Tuan Vu
(74) *Attorney, Agent, or Firm* — Ascenda Law Group, PC

(57) ABSTRACT

Data Brick is a state of the art solution to access the data through high speed data access mechanism that is exceptionally fast and is associated with low CPU consumption cost. The Data Brick stores relatively static reference data in the form of a programming language Load Module. The Load module contains the data can be launched into the application program memory and this data can be accessed very efficiently in a programming language program. Static application data that is accessed by multiple applications in a mainframe Batch environment is a prime candidate for the Data Brick.

19 Claims, 2 Drawing Sheets

(52) U.S. Cl.
CPC .... *G06F 9/44521* (2013.01); *G06F 17/30501* (2013.01); *G06F 17/30935* (2013.01)

(58) Field of Classification Search
CPC ............... G06F 8/75; G06F 17/30575; G06F 17/30451; G06F 12/16; G06F 9/44505; Y10S 707/99945
IPC .................................................. G06F 9/44505
See application file for complete search history.

(56) References Cited

U.S. PATENT DOCUMENTS

| | | | |
|---|---|---|---|
| 5,812,843 A | | 9/1998 | Yamazaki et al. |
| 6,032,143 A * | | 2/2000 | Leung ............... G06F 17/30451 |
| 6,430,708 B1 | | 8/2002 | Evans |
| 6,578,194 B1 | | 6/2003 | Baumgart et al. |
| 7,194,479 B1 * | | 3/2007 | Packham ............ G06F 11/3684 |
| | | | 707/999.102 |
| 2006/0277531 A1 * | | 12/2006 | Horwitz ................... G06F 8/75 |
| | | | 717/137 |
| 2009/0157758 A1 * | | 6/2009 | Lee ................... G06F 17/30575 |
| 2012/0192191 A1 | | 7/2012 | Jellinek et al. |

OTHER PUBLICATIONS

StandardCobolV4, "IBM OS Full American National Standard COBOL Compiler and Library", Version 4, Programmer's Guide, pp. 1-460, copyright 1972 <CobolV4.pdf>.*

ISSC, "Cobol Programming: Fundamental", 2004, IBM Corporation, pp. 1-236<ISSC.pdf>.*

IBM_StandardCobolV4, "IBM OS Full American National Standard COBOL Compiler and Library," Version 4, Programmer's Guide, copyright 1972 <IBM_COBOL_V4_May72.pdf>, pp. 1-460.

ISSA, COBOL Programming: Fundamental, <CoBol_FundaM04.pdf>, Version 1.0, 2004, IBM Corporation, pp. 1-235.

IBM_z/OS, "Application Programming on z/OS," IBM, <zOS_IBM06.pdf>, copyright 2006, 2010, pp. 1-80.

* cited by examiner

SYSTEMS AND METHODS FOR DATA BRICK CREATION AND USE

The present application is a continuation of U.S. application Ser. No. 13/340,004, filed Dec. 29, 2011 (now U.S. Pat. No. 9,317,305); the disclosures of each of the above-referenced applications are incorporated by reference herein in their entireties.

FIELD OF DISCLOSURE

The present disclosure generally relates to accessing data, and more particularly, to systems and methods for improving the efficiency of file processing in terms of CPU cost reduction and I/O processing.

BACKGROUND OF THE DISCLOSURE

Despite innovations leading to more robust and efficient computing systems and software, the role of mainframe computing remains vital to many businesses and organizations. In most cases, mainframe computing systems that are in use today were originally implemented prior to the computing innovations of the 1980's and 1990's. However, many businesses and organizations have concluded that it would be too expensive and too intrusive to day-to-day business operations to upgrade their major systems to newer technologies. Therefore, to enable continued expansion of computing infrastructures to take advantage of newer technologies, much effort has been devoted to developing ways to integrate older mainframe technologies with newer server and component based technologies. For instance, COBOL is one of the oldest programming languages. It is a legacy language in use by many organizations. Its name is an acronym for Common Business-Oriented Language, defining its primary domain in business, finance, and administrative systems for companies and governments.

Traditionally, the mainframe batch application programs access data (static or dynamic) through input datasets. These processing routines are typically opened, read, and closed to access and transfer data from a database. Stated another way, the traditional mainframe application developers access data for use in a program via the file input/output (I/O). Application developers have not attempted to efficiently access static data via application data loaded into an application program.

The aforementioned traditional process involves high consumption of I/O processing and high CPU cost for accessing the data through the datasets. Therefore, a need exists for a system and method for increasing computing efficiency and speed within a mainframe environment.

SUMMARY OF THE DISCLOSURE

These above disclosed needs are successfully met via the disclosed system and method. For instance, the present system and method improves efficiency of the file processing in terms of CPU cost reduction and reduction of I/O processing. In the present system, a Data Brick (load module) is created and/or loaded by the system into the application program memory.

In various embodiments, a system may include a processor configured to create a load module, a tangible, non-transitory memory configured to communicate with the processor, the tangible, non-transitory memory having instructions stored thereon that, in response to execution by the processor, cause the processor to perform to create a load module. These operations may include, for example, identifying files stored in a dataset to be stored in the load module for retrieval. These operations may also include reading files to be used by an application program into a load module creation program. Furthermore, these operations may include creating, by the processor, a contiguous record of the files. These operations may include assembling the record of the files in the text record in the object module. These operations may include writing the object module via a link edit command. Also, these operations may include compiling, by the processor, the created object module in to the load module.

In various embodiments, in response to creation of the load module, the data may not be accessed from the dataset. Instead, this data may be accessed directly from the load module. Also, in response to creation of the load module the data is not accessed from the dataset via open, read, or close commands. This system may eliminate contention occurring in response to a plurality of programs concurrently accessing the data stored in a dataset as the load module may be accessed concurrently by a plurality of programs.

In various embodiments, access of the data via the load module is more efficient as compared with direct access of the data stored in the dataset. Also, this system results in a reduction of Input/Output processing by accessing the data via the load module as compared with access of the data stored in the dataset. This system may comprise a header record including the first record is the electronic software delivery header record containing the load module name, followed by two application headers, followed by the contiguous record of data to be stored in the load module (e.g. the data to be accessed). The load module may be stored in an application load library.

In various embodiments, assembling the record of the data in the text record in the object module, further comprises loading the load module copybook with the data. In various embodiments, though it may be coded in any suitable programming language, the system is coded in COBOL.

In various embodiments, the system may comprise storing, by a computer based system for retrieving data, data in a text record of an object module of a load module. This system may access the load module via a procedure pointer. This system may assign a load module copybook to the address of the load module and load the load module copybook with the data.

BRIEF DESCRIPTION OF THE DRAWINGS

A more complete understanding of the present disclosure may be derived by referring to the detailed description and claims when considered in connection with the Figures and Tables, wherein like reference numbers refer to similar elements throughout the Figures, and:

DETAILED DESCRIPTION

Figure 1:
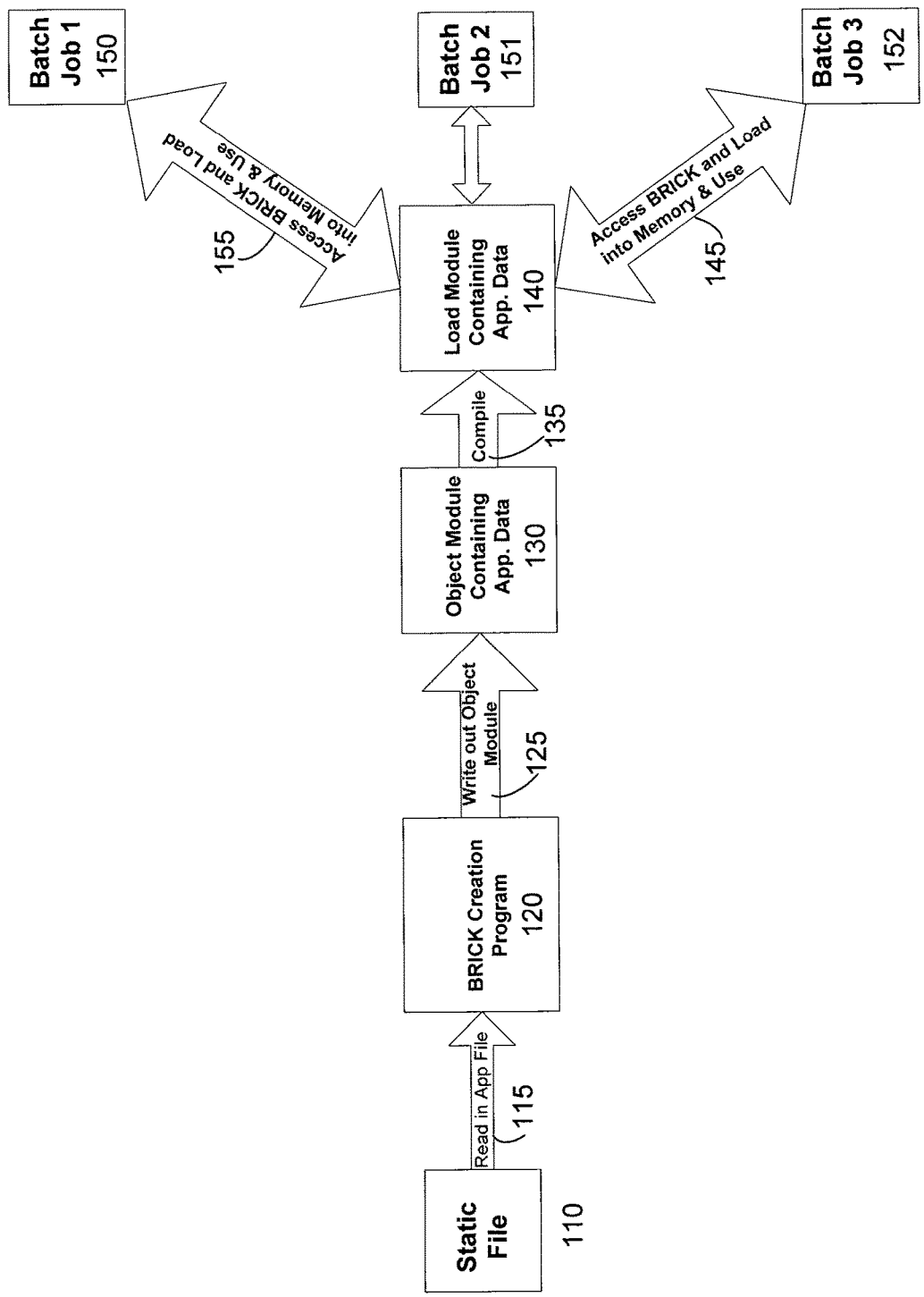
FIG. 1 is a combination block diagram and flowchart illustrating an exemplary architecture for data brick creation and implementation according to various embodiments of the present disclosure.

The detailed description of various exemplary embodiments herein makes reference to the accompanying drawings and pictures, which show the exemplary embodiment by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In general, a Data Brick 101 is a new method of storing and accessing program data. The Data Brick 101 is designed to allow high speed access to data with exceptionally low CPU consumption cost. A Data Brick 101 is intended to be used for relatively static reference data, as opposed to data which is frequently updated. Data Bricks 101 can be read by a program (such as a COBOL program) through, for instance, use of a "SEARCH ALL" verb. In various embodiments, a Data Brick 101 may be mapped by the program through the use of a standard LINKAGE copybook.

In operation, a file of static data previously stored to a database which is read or would be read by multiple batch jobs is identified. This data is appropriate for the Data Brick 101 system.

A Data Brick 101 may be created from any data source. In some cases, depending on the programming language, a constraint may be the size of the file. For instance, 16 MB is the largest Data Brick 101 which can be created in COBOL, due to COBAL load module being limited in size to 16 MB. In various embodiments, the input file is a fixed length flat file. The Data Brick 101 creation process is accomplished using Job Control Language (JCL). A JCL is a scripting language used on mainframe operating systems (such as the IBM mainframe operating systems) to instruct the system on how to run a batch job or start a subsystem. In various embodiments, a JCL reads the input file, processes the data, and writes a load module to a specified load library. As discussed below, this Data Brick 101 is ready from consumption.

A Data Brick 101 is a physical load module. A typical load module contains a compiled program with calls to secondary data stores and routines; however, the Data Brick 101 (load module) contains the data with no additional calls to secondary data stores and outside routines. A standard load module has an entry point, which is the first program instruction to be executed. A Data Brick 101 load module also has an entry point; it is the first byte of the data.

The Data Brick 101 creation process includes reading the static data into a single contiguous working storage item in the Data Brick creation program 102 (such as a COBOL program). For instance, though any programming language may be used, in various embodiments, the Data Brick creation program 102 places the static application data into the COBOL object module layout, and writes out an output file which looks like an Object module created in the compilation process. The first record written out by the Data Brick creation program 102 may be an ESD record. In this record, the name of the Data Brick 101 is coded, and the rest of the ESD record is kept intact. This record may be the first record in the Brick Load module 103. The same rules that are used during the compilation process are used while creating the Data Brick 101. Other application header records may be written while creating Data Brick 101. These may contain reference information, such as the job that created the Data Brick 101. A text record essentially holds the application data in the Data Brick 101. In general, there is a constraint of 56 bytes available to hold the application data within the structure of the text record, the rest of the text record is not used. The Data Brick creation program 102 fills up the 56 bytes with application data and writes out each text record, this happens until all the application data held in one long record is written out into the multiple text records, with each text record containing 56 bytes of data. Finally, a trailer record is written which typically contains the total record count info. The output file written out by the Brick creation program 102 is distinct from, but similar to, the Object module created in a compilation process. The output file written out by the Brick creation program 102 consists of the static application data. The object module is then link edited to produce a Load Module called the Data Brick 101.

Data Brick 101 will be moved to the Application Load Library and will be available for consumption to all or a subset of all of the application programs. To consume the Data Brick 101, the application program uses the Procedure Pointer to get the addressability of the specific Data Brick 101, and then assign the Brick copybook to the address of the Data Brick 101. In response to the Brick copybook being loaded with the data, the Brick copybook may be available for used by the application program (such as a COBOL application program). The application program could use SEARCH ALL verb to access the Data Brick 101 in an efficient manner.

Because Data Brick 101 is stored as a load module, programs can directly call Data Brick 101 using some programming language statements that are unlikely to have been used historically to access data. Once the Data Brick 101 is called, COBOL will load (place) the Data Brick 101 data into the linkage section of application program. The application program generally contains a copy book which will map the data in Data Brick 101.

This system reduces the I/O and cost of file or dataset access. Historically, several techniques have been implemented to speed up the file processing and reduce the associated cost, but the current system solves the problem from a totally different dimension. This system shuns the file access through the dataset I/O operations such as the Open, Read, and Close. Stated another way, I/O operations such as the Open, Read, and Close are not used to access or load Data Brick 101 data. Using this system, Data Brick 101 is created and/or Data Brick 101 data is stored within the application Load Module. As needed, the contents of the Load modules are loaded into the application program memory to access the data very efficiently. The application Load Modules typically contain the executable instructions of an application program, but in this innovation, static application data is stored within a load module for access. Compared to the traditional methods, this static application data may be accessed much faster and with out the need for additional I/O operation steps.

This system reduces file access I/O, reduces the file access costs, decreases the job elapsed times, increases the job throughput, decreases storage costs, and also removes the job contentions while accessing the same datasets. Contrary to conventional wisdom, which is to improve the file access through various innovations such as the accessing the data through the EQSAM datasets, and faster DASD etc., this system unconventionally accesses the application data through the application Load modules or Data Bricks 101 rather than read the data through the file I/O. Typically, the Load modules are created through the compilation process and the applications are forbidden to write into the Load modules. The present system challenges the traditional thought process by making the application process create the Load modules and place the application data within the Load module (in the text record) in the Data Brick 101 and access the data as quickly as one could access the Load module instructions.

For example, Table 1 is an exemplary JCL to create Data Brick 101.

The Brick load module may be placed into the specified UBATLOAD library. When creating a new Data Brick 101, strong consideration should be given to the update frequency of the source data. If the source data is a DB2 table, the Brick creation process JCL may be added to the job which updates the table, or the Brick creation process can be a new job, which uses the DB2 update job as a predecessor in JOB-TRAC. It may also be appropriate to add an ADHOC batch job for the Brick creation process.

The Brick load module may contain metadata. In various embodiments, there are three header records which provide this information. The first header record may contains an accurate count of the number of records read from the input file, the LRECL of the input file, and data from the UCTL-CARD. Header-2 may contains information regarding the Job which created the Brick, along with the step names and a timestamp. Header-3 may provides the name of the input file, and the creation date of the file.

The header records are standard for all Brick copybooks. The application data may be defined in an array following the headers. A variable length copybook (ODO) may be configured to take advantage of a BRICK-REC-COUNT field stored in the first header record. Data Brick 101 application data may be ordered in a manner which allows a Binary Search to be performed (SEARCH ALL). The use of a serial search (SEARCH) may be accomplished but may result in lower performance as compared with a binary search. The data may be sorted on the key prior to Data Brick 101 creation process.

A control card may be used to create Data Brick 101. The control card may reside in the UCTLCARD library. Data Brick 101 creation process reads the first line of the control card. The remaining lines can be used as comments.

Table 2 is an exemplary program to load, address, and search Data Brick 101.

TABLE 1

```
//BRICKJOB      JOB (U,1011) ,'BRICK ',
//                    MSGLEVEL=(1,1),MSGCLASS=Q,TIME=1,NOTIFY=&SYSUID
//*
//CRTTXT       EXEC   PGM=NPTT87B
//*
//STEPLIB        DD DSN=TH0CT.PZVP.UBATLOAD,DISP=SHR
//               DD DSN=TH0CT.I1CICS.V22C.PXX.NRNTLOAD,DISP=SHR
//SYSPRINT       DD SYSOUT=*
//UCTLCARD       DD DSN=TH0CT.PZVP.UCTLCARD(UCTLCARD),DISP=SHR
//INFILE         DD DSN=TH0CT.SSE.INFILE,DISP=SHR
//OUTFILE        DD DSN=TH0CT.OUTFILE,DISP=SHR
//*
//LINK          EXEC PGM=IEWL,
//    PARM='MAP,LET,LIST,XREF,AMODE(31),RMODE(ANY),RENT'
//*
//SYSLIN         DD    DSN=PD5544A.OUTFILE,DISP=SHR
//               DD    DDNAME=SYSIN
//SYSLMOD        DD DSN=TH0CT.PZVP*.UBATLOAD,DISP=SHR
//SYSUT1         DD    DSN=&&SYSUT1,SPACE=(1024,(120,120),,,ROUND),
//                     UNIT=SYSALLDA,BUFNO=1
//SYSPRINT       DD    SYSOUT=*
```

TABLE 2

```
IDENTIFICATION DIVISION.
PROGRAM-ID. BRICKSSE.
ENVIRONMENT DIVISION.
INPUT-OUTPUT SECTION.
FILE-CONTROL.
DATA DIVISION.
FILE SECTION.
WORKING-STORAGE SECTION.
01 LT-BRICK                          PIC X(8) VALUE 'NBTPSSE'.
01 WS-BRICK-ENTRY-ADDR               PROCEDURE-POINTER.
01 WS-BRICK-TABLE-ADDR               REDEFINES WS-BRICK-ENTRY-ADDR
                                        POINTER.
01 WS-BRICK-BIN-ADDR                 REDEFINES WS-BRICK-TABLE-ADDR
                                        PIC S9(8) COMP.
01 MISC-DATA.
    05 SSE-RFRN-PRNT-SE-NBR          PIC X(10).
    05 SSE-RFRN-SUBM-SE-NBR          PIC X(10).
    05 SSE-CODE-SE-RLSH-TYPE         PIC X(3).
LINKAGE SECTION.
01 NTCSSELD.
    05 BRICK-HEADER.
        10 BRICK-REC-COUNT           PIC 9(8) COMP.
        10 BRICK-DCB-LRECL           PIC 9(4) COMP.
        10 BRICK-DATA-SOURCE         PIC X(20).
        10 BRICK-KEY-LOC             PIC S9(2) COMP.
        10 BRICK-KEY-LEN             PIC S9(2) COMP.
        10 FILLER                    PIC X(26).
    05 BRICK-HEADER-2.
        10 BRICK-JOB-NAME            PIC X(8).
        10 BRICK-STEP-NAME           PIC X(8).
        10 BRICK-PROC-STEP-NAME      PIC X(8).
        10 BRICK-BUILD-DATE          PIC 9(8).
        10 BRICK-BUILD-TIME          PIC 9(8).
        10 FILLER                    PIC X(16).
    05 BRICK-HEADER-3.
        10 BRICK-INFILE-DSN          PIC X(44).
        10 BRICK-INFILE-CREATE-DATE  PIC X(6).
        10 FILLER                    PIC X(6).
    05 SSE-ELEMENT OCCURS 1 TO 30000 TIMES
            DEPENDING ON BRICK-REC-COUNT
            ASCENDING KEY IS BRI-SSE-RFRN-PRNT-SE-NBR
                             BRI-SSE-RFRN-SUBM-SE-NBR
                             BRI-SSE-CODE-SE-RLSH-TYPE
            INDEXED BY SSE-IDX.
        10 BRI-SSE-RFRN-PRNT-SE-NBR    PIC X(10).
        10 BRI-SSE-RFRN-SUBM-SE-NBR    PIC X(10).
        10 BRI-SSE-CODE-SE-RLSH-TYPE   PIC X(3).
PROCEDURE DIVISION.
* The following statement loads the brick into memory
        SET WS-BRICK-ENTRY-ADDR TO ENTRY LT-BRICK.
* The following statement maps Brick copybook to the Brick
        SET ADDRESS OF NTCSSELD    TO WS-BRICK-TABLE-ADDR.
        PERFORM SEARCH-IT
        STOP RUN.
SEARCH-IT.
        SEARCH ALL SSE-ELEMENT
        AT END
            DISPLAY 'SEARCH FAILED'
            WHEN BRI-SSE-RFRN-PRNT-SE-NBR(SSE-IDX)
                    = SSE-RFRN-PRNT-SE-NBR
                AND BRI-SSE-RFRN-SUBM-SE-NBR(SSE-IDX)
                    = SSE-RFRN-SUBM-SE-NBR
                AND BRI-SSE-CODE-SE-RLSH-TYPE(SSE-IDX)
                    = SSE-CODE-SE-RLSH-TYPE
                DISPLAY 'SEARCH SUCCESSFUL          '
        END-SEARCH.
```

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or various embodiments combining aspects of both software and hardware. Furthermore, the system may take the form of a computer program product on a non-transitory computer-readable storage medium having computer-readable program code means embodied in the storage medium. Any suitable computer-readable storage medium may be utilized, including hard disks, CD-ROM, optical storage devices, magnetic storage devices, and/or the like.

Referring to FIG. 1, an exemplary Data Brick 101 creation and usage flow chart is depicted. In step 110, application files, which may comprise static application data, are identified. In step 115, these identified application files are read into the Brick creation program 102. As shown in step 120, the Brick creation program 102 reads in the records and creates a single record. Using blocks of bytes, (depending on the programming language, for instance 56 bytes for COBOL) are moved into the detail records in the Object Module. The first record is the Entry Sequenced Data (ESD) header record containing the brick identifier, (i.e. brick name), followed by 2 application headers followed by the detail records. After the detail records are written, the trailer record is written which contains the number of detailed records written. In some embodiments (depending on the programming language used) Data Brick 101 may be up to 16 MB in size. In step 125, the object module is written out. In step 130, the Object module undergoes Link Edit to produce the load module which comprises Data Brick 101. This load module may be compiled (step 135). The load module (Data Brick 101) is available for consumption. (step 140). Steps 145 and 155 depict various batch jobs (150, 151, 152) accessing Data Brick 101 by loading the load module into memory for use by the batch job.

Stated another way, working storage (variable size) of the load module application is directly loaded with the static data. Thus, the load module comprises all of the static data. The load module does not use file I/O to access the identified static data. Stated another way, a program running the Data Brick 101 system does not access a database for information using the open, read, and close commands. Thus, the amount of calls are greatly reduced using one or more Data Bricks in an application.

In various embodiments, using the Data Brick 101 System, the load module may contain those executable instructions needed to transfer the identified static data stored in the data brick (load module) to the program accessing Data Brick 101.

A search for the appropriate record may be facilitated by leveraging the Binary Search capability. Thus, this system eliminates the need to read the static application data via datasets (e.g. opening, reading, and closing to I/O statements). Using this system, Data Brick 101 may be created and/or loaded into the application program memory and accessed. This accessing of data may be from the from the program memory instead of a dataset and/or database table.

This system helps application modules (such as COBOL application modules) to access static application data in an efficient manner. Typically, the application programs (such as COBOL application programs) read the static application data through input/output datasets either sequentially or using an index. Historically, in response to the static application data being accessed across multiple programs and batch jobs, high I/O processing requests and associated CPU costs are incurred. Through this innovation, the identified application static data is converted into a reusable Data Brick 101 that can be concurrently accessed by multiple application programs very efficiently. As the identified static data (of Data Brick 101) is loaded into the internal memory of the application program, Data Brick 101 can be accessed efficiently with very little I/O and CPU cost. This system is also configured to improve the scalability and the throughput of the overall computing infrastructure. Moreover, this solution also reduces the batch job elapsed time. The amount of reduction in the elapsed time depends on the nature of work carried out by the batch job. For instance, if the batch job was typically accessing static application data from a DB2 table (database), then using Data Brick 101 could improve the elapsed time up to 20%. This solution may be used in a Customer Information Control System (CICS), and helping to reduce the response time of the application.

Figure 2:
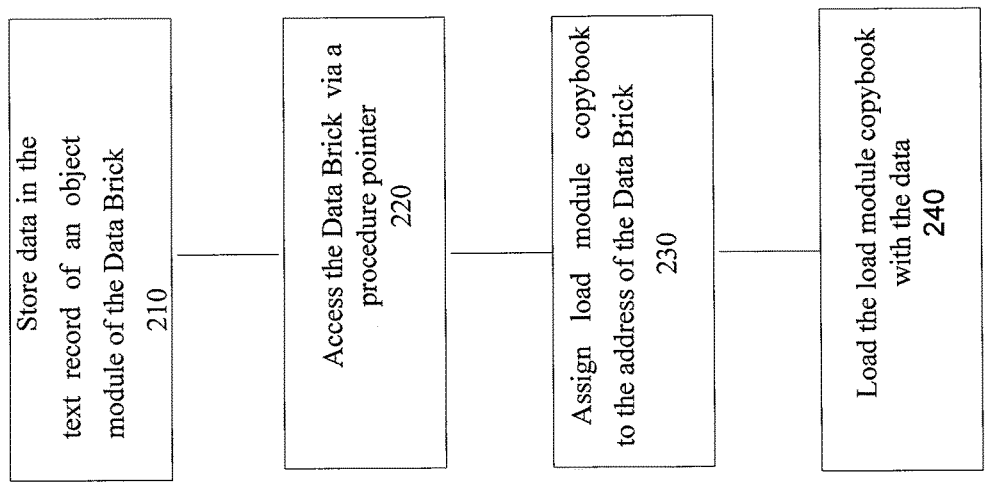
FIG. 2 is a flowchart illustrating a view of exemplary data implementation according to various embodiments of the present disclosure.

Referring to FIG. 2, an exemplary Data Brick 101 usage flow chart is depicted. For instance, in step 210 data may be stored in a text record of an object module of a Data Brick 101 for use by the system or a program. Data Brick 101 may be accessed via a procedure pointer. (step 220) The Data Brick 101 may assign the copybook of a load module to the address of Data Brick 101. (step 230) This copybook may be loaded with the data. (step 240).

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., Windows NT, 95/98/ 2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in various embodiments, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In various embodiments, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method is described herein with reference to block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to the Figures the process flows depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in various embodiments, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in *In Re Nuijten* to fall outside the scope of patentable subject matter under 35 U.S.C. § 101.

The invention claimed is:

1. A non-transitory computer readable medium having program instructions stored thereon, wherein the program instructions are executable by a computer system to implement a program that performs operations comprising:
   run one or more batch jobs to extract static data from a database;
   creating a file that includes the extracted static data, wherein the file has a layout of an object module produced by a compiler, wherein the layout includes a header record indicating a name associated with the object module, one or more data records including the static data, and a trailer record that specifies a number of records in the file;
   invoking a linker associated with the compiler, wherein the linker is executable to produce a load module from the file; and
   providing the load module to an application that specifies a pointer associated with the load module such that the extracted static data in the load module is accessible to the application.

2. The computer readable medium of claim 1, wherein the providing includes inserting data of the load module into a linkage section of the application.

3. The computer readable medium of claim 1, wherein the providing includes storing the load module in a library accessible to the application.

4. The computer readable medium of claim 1, wherein the providing includes loading the load module into a memory accessible to the application.

5. The computer readable medium of claim 1, wherein the layout is a layout of a COBOL object module, and wherein the linker is a COBOL linkage editor.

6. The computer readable medium of claim 1, wherein the providing includes providing the load module to a plurality of batch jobs of the application such that the load module is concurrently accessible by the plurality of batch jobs.

7. The computer readable medium of claim 1, wherein the file does not include program instructions.

8. The computer readable medium of claim 1, wherein the creating includes organizing the extracted static data in the file such that the data is searchable using a binary search.

9. The computer readable medium of claim 1, wherein the program includes a Job Control Language (JCL) script.

10. The computer readable medium of claim 1, wherein the header record is an external symbol dictionary (ESD) record that specifies a name of a file.

11. A method implemented by a computing system automatically executing program instructions, comprising:
    the computing system retrieving, from a database, static data to be provided to an application;
    the computing system writing a file having a layout of an object module produced by a compiler usable to compile the application, wherein the file includes a header record indicating a name associated with the file, one or more data records including the retrieved static data, and a trailer record that specifies a number of records in the file;

the computing system instructing a linker associated with the compiler to produce a load module from the file, wherein the load module includes the static data from the file; and the computing system storing the load module in a library referenced by the application that specifies a pointer associated with the load module such that the static data in the load module is accessible to the application.

12. The method of claim 11, wherein the application is a COBOL application compiled by a COBOL compiler.

13. The method of claim 11, wherein the application does not retrieve data from a file, and wherein the file does not include program instructions.

14. The method of claim 11, wherein the file includes 1) a header record indicating a name associated with the file, 2) a set of contiguous records that include the static data, and 3) a trailer record indicating record count information.

15. The method of claim 11, wherein the retrieving, writing, and instructing are performed by a Job Control Language (JCL) script executed by the computing system.

16. The method of claim 11, further comprising:

the computing system executing the application as a plurality of batch jobs that access the static data concurrently.

17. A non-transitory computer readable medium having program instructions stored thereon, wherein the program instructions are executable by a computer system to cause the computer system perform operations comprising:

reading data from a database source;

writing an output file via a program other than a compiler, wherein the output file has a layout of an object module created by the compiler, wherein the layout of the written output file includes a header record, one or more data records, and a trailer record that specifies a number of records in the output file;

inserting the data into the written output file, wherein the data is inserted into the one or more data records in the written output file;

invoking a linker that accesses the written output file to generate a load module; and providing the load module to an application that specifies a pointer associated with the load module such that the data is accessed by the application upon execution.

18. The computer readable medium of claim 17, wherein the reading includes instantiating a plurality of batch jobs to read the data from the database source.

19. The computer readable medium of claim 17, wherein the layout is a layout of a COBOL object module, and wherein the program instructions implement a Job Control Language (JCL) script that performs the reading, writing, inserting, and invoking.

* * * * *